US011784423B1

(12) United States Patent
Ruggiero

(10) Patent No.: US 11,784,423 B1
(45) Date of Patent: Oct. 10, 2023

(54) KNEE SAVER MULTIPLEX ELECTRICAL TERMINATION DEVICE BOARD

(71) Applicant: Alexander Ruggiero, Millsboro, DE (US)

(72) Inventor: Alexander Ruggiero, Millsboro, DE (US)

( * ) Notice: Subject to any disclaimer, the term of this patent is extended or adjusted under 35 U.S.C. 154(b) by 0 days.

(21) Appl. No.: 16/865,420

(22) Filed: May 4, 2020

Related U.S. Application Data

(63) Continuation-in-part of application No. 16/214,239, filed on Dec. 10, 2018, now Pat. No. 10,749,321.

(51) Int. Cl.
*H01L 23/48* (2006.01)
*H01R 9/24* (2006.01)
*H02G 3/08* (2006.01)

(52) U.S. Cl.
CPC ........... *H01R 9/2491* (2013.01); *H02G 3/081* (2013.01)

(58) Field of Classification Search
CPC ........ H01H 9/08; H01R 9/2491; H02G 3/081; H02G 3/086; H02G 3/18; H02G 3/16; H02G 3/083; H02G 3/08; H01L 23/48
USPC .................................................. 174/549, 53
See application file for complete search history.

(56) References Cited

U.S. PATENT DOCUMENTS

| | | | | |
|---|---|---|---|---|
| 7,767,905 B2 * | 8/2010 | Meyer | ..................... | H02G 3/086 439/535 |
| 9,368,948 B2 * | 6/2016 | Ruggiero | ............... | H02G 3/086 |
| 9,502,789 B2 * | 11/2016 | Umlauf | ..................... | H01R 4/36 |
| 2001/0023769 A1 * | 9/2001 | May | ......................... | H02G 3/08 174/481 |
| 2006/0148329 A1 * | 7/2006 | Zahnen | ..................... | H01R 4/36 439/709 |
| 2010/0238651 A1 * | 9/2010 | Coleman | ............ | G01N 21/8806 362/139 |
| 2014/0322990 A1 * | 10/2014 | Umlauf | .................. | H01R 11/09 439/814 |
| 2016/0322754 A1 * | 11/2016 | Green | ................... | H01R 13/743 |
| 2018/0041015 A1 * | 2/2018 | Moss | ........................ | H02G 3/08 |
| 2018/0187380 A1 * | 7/2018 | Naylor | ....................... | E02D 3/11 |

FOREIGN PATENT DOCUMENTS

CN 207910407 U * 9/2018 ............... H02G 3/08

OTHER PUBLICATIONS

Welders Guide Book_pp. 1-32_Feb. 2011.*

* cited by examiner

*Primary Examiner* — Timothy J Thompson
*Assistant Examiner* — Guillermo J Egoavil

(57) ABSTRACT

The Knee Saver Multiplex Electrical Termination Device Board is comprised of; a one-piece board, consisting of a combination of several alike/or unlike termination devices, where multiple termination devices are within a single enclosure, which can handle more than one power source, with different amperages, at the same time, and used in conjunction with the Knee Saver U.S. Pat. Nos. 9,960,580, 9,368,948, 10,320,169, and patent application Ser. No. 16/214,239 which is installed, into a single HUB or Dielectric body, without the need to get down on your knees to install receptacles.

2 Claims, 6 Drawing Sheets

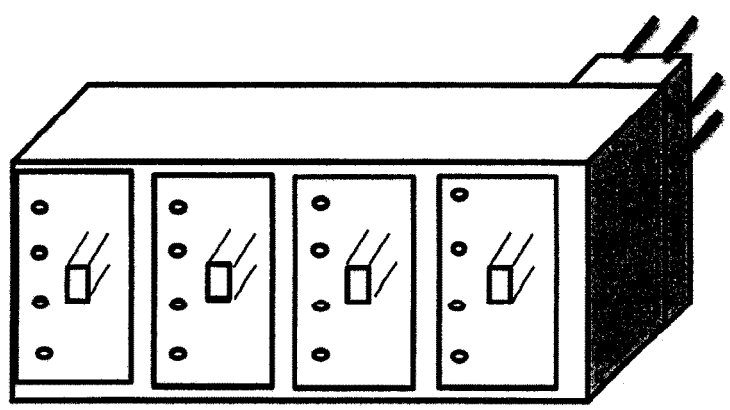
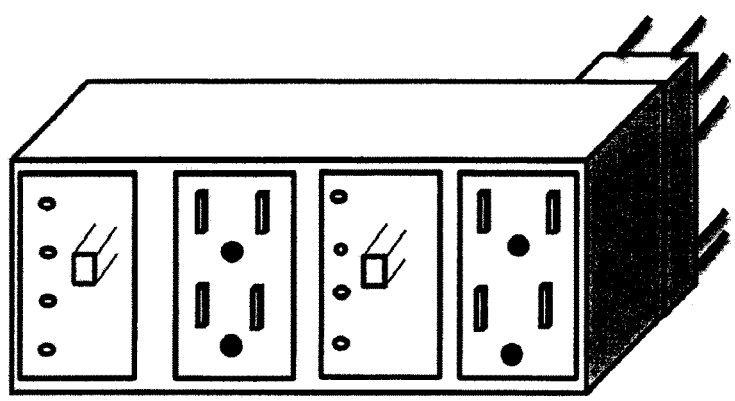
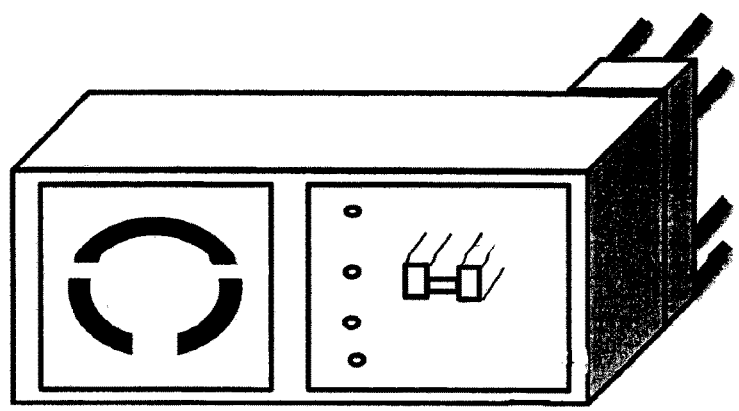
FIG 7

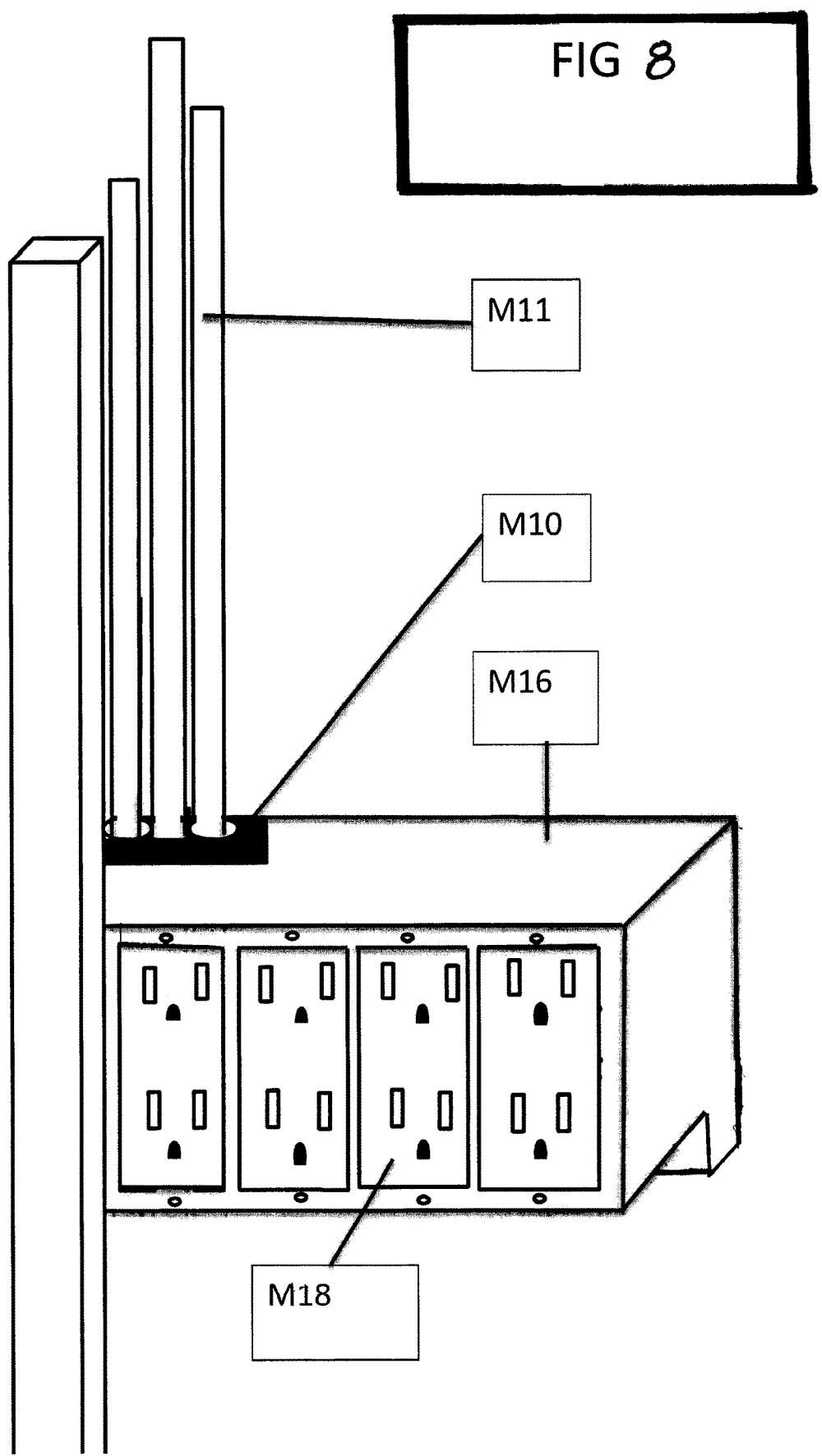

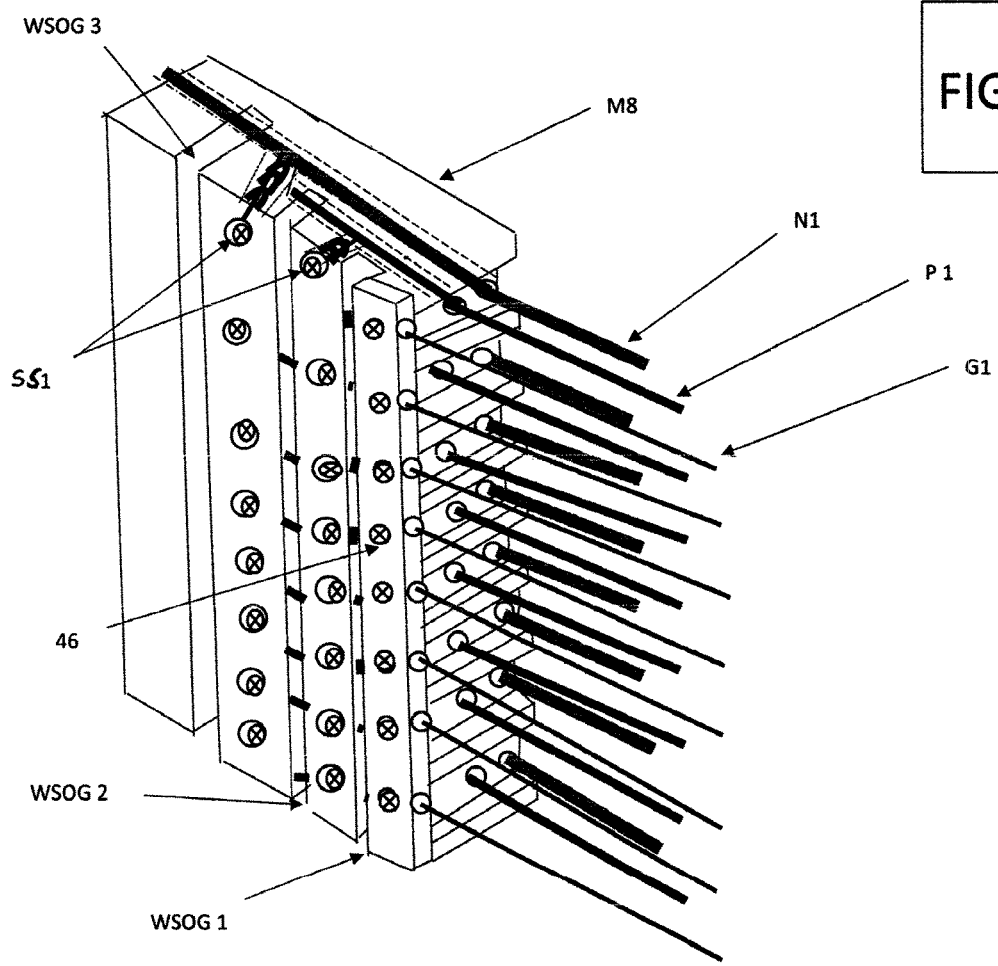

KNEE SAVER MULTIPLEX ELECTRICAL TERMINATION DEVICE BOARD

CROSS-REFERENCE TO RELATED APPLICATIONS

This application is a continuation-in-part to application Ser. No. 16/214,239 Which claims priority to U.S. Pat. No. 10,320,169 entitled Knee Saver Modulator Universal Electrical Box which claims priority to U.S. Pat. No. 9,368,948 filed on Oct. 28, 2014 entitled Time Saver Electrical Switch which claims priority to U.S. Pat. No. 9,960,580 filed on Apr. 10, 2013, entitled Universal Electrical Box, which claims priority to U.S. Provisional Patent No. 61/687,900 filed on May 3, 2012, entitled Universal Electrical Box, the contents of which are relied upon and incorporated herein by reference in their entirely.

In contrast, to the prior art's described receptacle's structure and installation process is the structure and installation process of the receptacle portion of the present invention.

First and foremost is the ability to stand up while installing all the wires to a dielectric body, then sliding that fully wired dielectric body along with a TERMINATION DEVICE BOARD into the already fastened junction box on a wall stud, in the electrician's first trip to the location.

This can be done with the use of the KNEE SAVER MULTIPLEX ELECTRICAL DEVICE BOARD.

This device has features which give it its name.

First, the purpose. The ability to install one or more termination devices, while standing up, thereby reducing leg and hip injuries to installers.

Second, the ability to have two or more elements, (termination devices) in a complex relationship.

Examples would be the various "Multi-receptacle/switch boards", see (FIG. 7).

The termination board can have:
(4) receptacles, or
(2) receptacles (2) switches, or
(4) switches, or many more additional combinations.

Third, all components can fit inside a "standard Size" metal or PVC Box, according to code requirements.

By using the KNEE SAVER ELECTRICAL DEVICE BOARD, no time is wasted interconnecting SIMILAR or DIFFERENT termination devices. Today, when installing (4) switches for example, each switch has to have a ground wire made for it, then each ground wire must get connected to the main ground wire. Then all the white wires have to get connected to each other. Installing the black wires is even more difficult and tedious.

This old process, cannot be done on the first visit to the work site, as the present application can. No prior art offers different kinds of termination devices in one unit, plug and play, using the same HUB, as the present invention. Here's How it works.

The ROMEX wire is lead thru and held by, the ROMEX connector on the ROMEX incoming bracket (M10). If the cable was BX, the BX wire is lead thru and is held by the BX connector on the BX incoming bracket (M10).

A dielectric body or HUB (M8) is inserted into the dielectric holder (NOT SHOWN). It is held there until each wire is pushed thru the HUB.

At this point, all cables are attached to a connector bracket with the wires hanging down, thru the bracket, and ⅜ wire coatings were removed from the end of each wire.

All wires form a wiring Harness, held Together by small pieces of electrical tape (M4).

All individual wires are then pushed thru The HUB, one at a time, until it stops. Once it stops, the set screw is tightened.

Each wire gets fastened individually.

Tighten the set screw after each wire insertion.

The White wires are pushed, all the way in on the right column, on the side of the HUB.

The Black wires are pushed, all the way in on the left column, on the side of the HUB.

Install all the ground wires to the ground bar.

Grab the incoming bracket with one hand, and the HUB and attached termination board, with the other. Slide them (as one unit) into the box (M5).

Snap on the cover or close the cover on a hinged door.

Leave the protective termination device, dust and paint shield (not shown) on.

Note: There are no electrically charged surfaces on the sides of the termination devices.

FIG. 3 shows the basis of the wiring harness. Loose wires are bound together and attached to a HUB.

By constricting the wires into a non-flexing bundle or harness, usage of enclosure space is optimized, and the risk of a short is decreased. Also, the need for someone to be at the same level of the junction box, is eliminated.

It should be understood that this is only one of many variations of wiring harnesses which can be used with the present invention.

FIG. 2 is the UNIVERSAL ELECTRICAL BOX's two piece device. Any termination device (M70), which has prongs sticking out of the back, can be plugged into the HUB (M8). The layout of the prongs, control where it will pick up the current, and what line or lines it will transfer that current to.

Looking at the gauge (39) you can see the #14 wire ports are on the top and the #12 wire ports are on the bottom. A 15 amp (#14 wire) termination device has prongs on the top half of its device. If the #14 wires were installed in the HUB, the prongs of the 15 amp termination device would be on the same level, and match so the termination device would have power.

In this scenario, if a 20 amp termination device was plugged in, (the prongs are positioned on the bottom half of the device) it would not work. The #14 wire power line would be nowhere near the termination devices prongs. It wouldn't line up, no match, no current.

This design is to take "decision making" out of the of the Hands of the installer, or to use the term "Idiot proof".

One might think that if the wrong wire was used and the wrong terminal device was used, it would work, Not so.

First, the Bigger #12 wire doesn't fit into the #14 slot in the HUB. Second, and most important, the walls are open (The present invention is for new construction or remodeling only) and anyone can see what color the sheathing is. White for #14 wire and yellow for #12 wire The HUB has been improved, in this application, by the addition of the Wire Stick Out Groove in FIG. 9. The installer can now be certain the set screw made contact with the wire, since the wire is "beyond" the set screw.

Now the ability exists, to see all the wires, allowing the inspector to see the connections while the receptacle is already installed. The cover can be opened for viewing.

It has the ability to handle different gauged wires at the same time.

This particular invention model can handle up to nine cables.

You can also put your hand in the box, while the circuit is energized at any time after installation, because there are no exposed energized wires or screws.

The wires are all in columns, so the color of the plastic protective coating on the wires, (black, white, red, or green) for example would make it obvious if a wire were installed in the wrong location. There is no need to insert wires in the rear of the receptacle, there is plenty of space to install wires on the side surface.

All ground wires are neatly attached to aground bus element, not bunched up with a wire nut.

All wires are installed from the breaker box, or service panel, to the junction boxes on the on the first day, no matter what receptacle you use.

REFERENCES CITED

U.S. Pat. No. 5,619,13 Apr. 1997 Jorgensen
U.S. Pat. No. 9,960,580 B1 May 2018 RUGGIERO
U.S. Pat. No. 7,052,313 April 2005 Gorman
U.S. Pat. No. 9,368,948 B2 Jun. 2016 RUGGIERO
U.S. Pat. No. 6,341,981 April 2000 Gorman
U.S. Pat. No. 10,320,169 B1 RUGGIERO
U.S. Pat. No. 6,376,770 February 2000 Hyde
Ser. No. 16/214,239 RUGGIERO
U.S. Pat. No. 7,628,643 August 2008 Pyrros
U.S. Pat. No. 6,843,680 May 2003 Gorman
U.S. Pat. No. 7,767,95 June 2008 Meyer
U.S. Pat. No. 6,945,815 June 2004 Mullally
U.S. Pat. No. 6,220,897 April 2001 Maxwell
U.S. Pat. No. 8,117,746 February 2012 DiLorenzo
U.S. Pat. No. 8,567,47 October 2013 DiLorenzo
U.S. Pat. No. 8,881,390 November 2014 DiLorenzo

BACKGROUND OF THE INVENTION

1. Field of the Invention

The present invention relates to systems and devices for the interconnection of wires to switches and receptacles within junction boxes. More particularly, the present invention relates to the installation process of the wire connection system and the manner in which it connects wires to a receptacle or switch, within the confines of a junction box.

2. Prior Art Description

While there have been many patents issued on receptacles and switches, most are not used for various reasons. Some are too expensive to make, while others do not save any installation time and are not cost effective. Some even look great on paper but would never pass a building's electrical inspection. There is an electrical code that changes every year, in an attempt to make the use of electrical power, safer.

In order to have a clear understanding of the need for having the present invention, one must understand the workings of the Knee Saver electrical box and the Time Saver electrical switch. A physical comparison of them to prior art's wiring connections of a receptacle and a switch is described below.

Most building codes require that all connections between wires, switches, receptacles, and/or any other hard-wired components be contained within some form of fire-retardant junction box. Traditionally, junction boxes are made of metal or polyvinylchloride (PVC).

During the rough construction phase, the junction boxes are mounted within various walls of the building. The wires are then run between the junction boxes.

Depending upon the circuit design being installed by an electrician, it is common for various wires to be directly interconnected within a junction box. Such wire-to-wire connections are traditionally made using wire nuts. To make such a connection, wires are twisted together in front of a junction box. The twisted wires are capped with a wire nut. The wire nut and the wires are then bent back into the confines of the junction box.

In the initial visit by the electrician, he/she will install all the electrical cables going to all the junction boxes. Once all the wires are in the boxes, the electrician connects only the ground wires, for both receptacles and switches. The electrician stops work and waits for an electrical inspection. If receptacles and switches were installed, the bunch of wires in the box would make it impossible to determine if the ground and other wires were installed properly.

Only after an approval by an electrical inspector, can an electrician continue with the installation.

In the second trip to the work site, he/she can install the receptacles, switches, and lights.

With the exception of a few specialty receptacles, most commonly used prior art receptacles are installed in the following manner.

The receptacle is installed about 16 inches from the floor. The electrician has to bend or remain on his/her knees, until all of the following procedures are completed.

A standard sheathed cable contains a black, a white, and a bare wire. Some cabled wires come in different thicknesses or gauges. Only wires of the same gauge can be joined together. At least one sheathed cable goes from box to box, supplying power and electrical continuity. However, there can and usually are, other cables that go into that same junction box. An additional cable may send electricity to a receptacle in a different direction or may be for a specialty receptacle. Another cable may be for a switch, a light, or for any number of reasons. Usually only four cables can go safely into a one gang box. Generally, when the casing of a sheathed cable is removed, you have three wires sticking out. If there are three cables, there are nine wires, etc.

The standard receptacle has two screws on either side of it. One side the gets black wires attached to the brass screws, while the white wires get attached to the silver screws, on the other side. There are locations in the back of the receptacle, to push wires into, rather than attach the wires to the screws. The receptacle, which may have wires wrapped around the screws on its sides, and have some wires inserted in its back is then pushed inside the box.

However, as the wires are manipulated back into the junction box, sometimes the wires separate under the wire nut and the connection fails. An electrician must then inspect all the connections in the circuit to discover where the break has occurred.

To complicate matters, wire connections often cannot be readily observed within the confines of a junction box. Wires connected to a receptacle or a switch are blocked from view, behind the receptacle or switch.

Likewise, wires connected together with a wire nut, behind a switch or a receptacle is also blocked from view. These connections often become loose and are impossible to determine. The wire nuts have to be removed and retightened. The receptacle has to be pulled out, but may or may not have to be reconnected. Another issue is only one ground wire can be connected to a ground screw on a receptacle. A separate ground wire has to go from the receptacle to a bundle of ground wires fastened with a wire nut. An unviewable ground connection is one of the major reasons why the work stops, during the initial installation and an inspection is made.

After the wire nut connections are pushed inside the box, the receptacle is used to push the wires back even further. This pushing process is what sometimes causes other connections to fail.

If wires are inserted into the back of a receptacle, the screws on the sides still get energized, whether there are wires connected to the side screws or not, which is a safety concern.

When looking at an installed receptacle, in a finished wall with the cover plate off, you can see wires connected to the side screws, but that's it.

You CANNOT distinguish:
What are incoming and outgoing lines?
Are the ground wires connected?
Is each receptacle grounded?
Are the wires long enough to change a receptacle later on, if needed? A code requirement.
How many wires are going into the box?
The lists of questions go on and on.

When painting the walls, the wires in the box often get painted too, hampering visibility. My prior art, continue-in-part Patents, address those concerns.

First, it stacks like colored wires. You will be able to see all the black wires in one vertical stack. Similarly, the white wires and the green or bare ground wires, have their own distinct stack. Red wires are also power lines, they go with the black wires. Looking at the rear portion or HUB, will tell you if all the wires are where they are supposed to be, using the "like color stacking system". The present invention encourages the installer to install the termination device in the roughing process. Therefore, all termination devices will be available with a protective cover on the FACE of the termination device, for protection from paint and construction debris.

Switches are wired differently. Their construction is also different. For one thing, they have two screws, not four like the receptacle, and both screws are on the same side. Wires can also be inserted into its rear. An electrician must install a small black wire from switch to switch for power. All the white wires get connected to each other by use of a wire nut; there are no other locations on the switch to connect any white wire to. A short ground wire is connected to each device. Those wires are now connected to each other by a wire nut. A black wire from each new cable has to go to the brass screw on a switch. The other end of that cable gets its black wire and white wire attached directly to a fixture's black and white wires. The other screw, on the side of the switch, gets attached to another black wire directly from a power source or power from another switch.

Note, during the roughing process, while preparing to install wires for a switch, the walls are open and you can see what switch will control what device (the physical switch is not installed at this point.

Most building installations contain several locations within that building, with three or four switches in a gang of junction boxes. If you want four switches, you need one cable from a power source, and four cables going to fixtures, for a total of five cables. All five ground wires are twisted together, along with another separate short ground wire, capped with a wire nut and pushed to the back of the box. Later, additional short ground wires (one from each switch) gets attached to that short ground wire mentioned above, thereby grounding all switches. The black wire from a power source gets pushed into the back of the first switch near the screw. Three other small black wires go from switch to switch supplying power to each switch.

Usually, after the electrical inspection is made, but before the electrician returns, (which also may or may not be the same electrician), the insulation and/or wall boards are installed.

The electrician can't see and doesn't know what line will control what device. That is why it is very important to mark the wire sheathing beforehand. Otherwise, a lot of time will be spent trying to figure that out, and having to go back and forth to the service panel, that contains the circuit breakers.

After a complete installation, an electrician may have installed the first switch to control an overhead light. A second switch to control a fan and a third switch to control a receptacle for a lamp. If there was a miscommunication, and the owner wants the order of the switches to be different, it can be difficult in an already closed wall. Wires must be disconnected and reconnected or the switches physically must be moved. If you need to make the FIRST switch, the "LAST" switch, the wires may not be long enough.

U.S. Pat. No. 9,368,948 TIME SAVER ELECTRICAL SWITCH, (described below) simplifies the installation process by attaching all wires to the HUB or DIELECTRIC BODY.

While all wires are connected to the HUB, only the GROUND wires are electrically connected-in the HUB. All other connections, ("BETWEEN termination devices"), are connected modularly to each other.

The UNIVERSAL ELECTRICAL BOX, U.S. Pat. No. 9,960,580 (FIG. 1 & FIG. 2) is an assembly that simplifies the wiring of switches, receptacles and other such termination devices within a junction box. It utilizes a dielectric body (M8) having a front surface (#64) and a side surface (26). A plurality of side connector ports (#32, for black wires and #34 for white wires) are disposed on the side surface of the dielectric body. These side connector ports connect to wires that enter and leave the junction box (#14 & #16). A termination device (#70) is present at the front surface of the dielectric body. The termination device may be manufactured as part of the dielectric body (#38) or may be a removable plug-in unit. The termination device is a receptacle, switch, or similar device.

A plurality of conductive elements extends through the dielectric body and connects the termination device to the side connector ports. As such, electrical power is provided to the termination device through the side connector ports and the conductive elements that pass through the dielectric body.

The uniqueness of having the "SAME HUB" used for any type of termination device, within an enclosure, creates a base for new possibilities.

Today, if you have one or several prior art switches, positioned side by side, each fixture, a light or a fan for example, has to be directly attached or "hard wired" to an individual switch. Prior to a change in the Electrical Code, the neutral (white) wire was sometimes used as a black power line and painted black to indicate same. With the cover plate OFF, and the power ON, it remains a shock hazard. Work has to stop in order for an electrical inspector to observe; proper installation of all parts, and more importantly, to observe that the grounding connections are done properly. If prior art receptacles and switches were installed at this time, an inspector could not see the grounding connections, or any of the other connections.

In U.S. Patent Application US 2010/0288526 A1 to MEYER, Entitled, ELECTRICAL APPARATUS HAVING A QUICK CONNECT COMPONENTS, has "permanently attached" to its junction box, an apparatus that accepts another box (#300) which also holds a termination device within, see FIG. 1. Wires enter his box on the side, near the rear of the box. While it is better than other prior art, which leaves the "opening" of the box exposed to the inside wall, it's still unusable to someone skilled in the art, because that person knows, wires inside a box must be able to extend 4-6 inches beyond the front of the box, for removal of any contents of the box. While a physical box can remain in a wall, the contents of that box must be able to be removed without damaging the walls. He has listed 99 reference numerals, a manufacturing nightmare.

In U.S. Pat. No. 7,628,643 to Chrestos T. Pyrros entitled, Modular Electrical Receptacle, the first line of the abstract shows the first difference between it and the present receptacle invention. "A modular electrical receptacle configured so that more than one of the modular electrical receptacles can be connected to form a larger receptacle connected to a single source of power". Our dielectric body can have three power sources, at the same time. One for switches, one for the #14 power line and one for the #12 power line. Unlike Pyrros's receptacle, our dielectric body, allows the first termination device to determine if it will be #14 or a #12 wire circuit. That determination is made by the prong locations, on the posterior surface of the termination device. If the prongs are on the top half of the posterior surface of the termination device, it will be a #14 wire circuit. Prongs on the lower half of the posterior surface will become a #12 wire circuit. The #14 wires, from cables are connected to the top portion of the dielectric body. The #12 wires, from cables are connected to the bottom portion of the dielectric body. The selected prongs have to lineup with the selected wires or IT WILL NOT WORK.

The uniqueness of Pyrros's invention is in its ability to have receptacles on both sides of the "SAME WALL", using the same power line. Pyrro referenced U.S. Pat. No. 5,203,712 to Kilpatrick, April 1993 entitled, Circuit Wiring Device. It contains side by side modulated receptacles, which makes Pyrro's side by side receptacles nothing new.

U.S. Pat. No. 5,619,013 to Jorgensen, April 1997 entitled Gangable Electrical Box, has removable doors. Jorgensen's patent is being considered due to the fact that he can add switches or receptacles to his junction box. Jorgensen's idea is a method to add additional boxes or gangs for multiple switches or receptacles, by using a removable door. It uses two screws to fasten the door in place. U.S. Pat. No. 1,296,811 to Keller, entitled Switch Box, March 1919, contains a lug (a bent metal piece) and one screw to hold the door in place. Keller had the idea of adding additional boxes or gangs for switches and receptacles in 1919.

In the U.S. Pat. No. 6,376,770 B1 to HYDE, entitled QUICK CONNECTING UNIVERSAL ELECTRICAL BOX AND WIRING SYSTEM, utilizing a frame mounted on a wall stud. A box is then slid into the frame. He states the box can be pre-wired before being slid into the frame. He offers no method, no system, no device, to help install the wires into his box. A simple cable going in and out of the box means someone, skilled in the art, needs to find a way of holding his box while preparing each wire (six wires in this example), to remove the wire coating, then bending the wire at the end of each wire. Multiple termination devices would be possible but much more involved and not cost effective. Either way, someone skilled in the art, does not want to hold anything while he is changing tools, such as going from a screwdriver to pliers. Even if you clean and bend the wires first, you still must hold the device, also the lengths of the wires come into play.

Over the years, many devices have been invented in attempt to simplify the wiring of difficult types of electrical termination devices. However, these prior art devices are typically application specific, and can only be used as either a switch box or a receptacle box. Prior art devices that show modular connections are exemplified by U.S. Pat. No. 6,563,049 to Lindy Lawrence May, entitled Modular Electrical System, U.S. Pat. No. 7,762,838 to Gorman, entitled Safety Module Electrical Distribution, U.S. Pat. No. 8,649,133 to Benoit, Weeks, Savicki, entitled Plug Tail Systems. Some of these junction boxes eliminate the need for wire nuts. However, these junction boxes contain custom manufactured internal components. Thus, the junction boxes are more complex to use and more costly than traditional junction boxes.

However, in U.S. Pat. No. 8,613,624 to Alfredo Arenas, entitled Modular, wiring system With Locking Elements, as with all the other referenced prior art patents, the wire terminations are at the rear of the junction box and are hidden from view. As such, the number of wires entering the box, the quality of the connections, and the paths of interconnections cannot be visually observed without disassembly and removal of the components within the junction box.

Other prior art such as: U.S. Pat. Nos. 4,635,372, and 8,117,746, both to DiLorenzo, claim to be able to perform three tasks at one time. Those tasks include; installing an electrical box, installing the wiring, and installing a receptacle or switch. Its device would also place the receptacle or switch at the proper depth to align it with an applicable wallboard thickness. There is no mention of how the wires would be hooked up to a receptacle or switch. One must conclude that a standard receptacle or switch used today would be used for their invention.

In the U.S. Pat. No. 6,945,815 B1 to MULLALLY entitled, QUICK CONNECT ELECTRICAL OUTLET, FIG. 1 shows a single receptacle being inserted into his box, with eight connection points. The present invention uses a HUB with twenty-seven possible connections points. Page 5, line 51 " . . . receptacle "or" switches . . . " Page 5 line 53 & 54, "The receptacles and switches have corresponding mating connection means related to the previously wired outlet box termination blocks". The present invention can be inserted into the same HUB, whether it is a switch or a receptacle or switches or receptacles.

In U.S. Pat. No. 5,785,551 to LIBBY entitled QUICK CONNECT ELECTRICAL BOX, a junction box is designed for installation in a finished wall.

A need therefore exists for a simple and safer device, with an installation process which is less taxing on the body.

SUMMARY OF THE INVENTION

The Knee Saver prior art Patents, were all "continue-in-part" applications because each part was built on top of the prior Patent.

The goal was to invent a device that would allow a person skilled in the art, to install receptacles while standing up, thereby preventing Hip and knee injuries to the installer.

The FIRST Patent, Universal Electrical Box U.S. Pat. No. 9,960,580, invented a HUB that allows wires to be connected to it without making electrical connections (except for the ground wires).

The SECOND Patent, Time Saver Electrical Switch U.S. Pat. No. 9,368,048 was designed for a switch, utilizing the "same HUB".

The THIRD Patent, Knee Saver Modulator Universal Electrical Box U.S. Pat. No. 10,320,169 B1, made wire connections much more visible and a better means to hold the wires in place, while making a better connection between HUB and the termination devices.

Now it is possible, while standing up, to attach wires to a HUB, while having a MEANS of putting those WIRES in an ORGANIZED manner ALONG with the HUB into a SPECIFICALLY DESIGNED BOX, without the installer getting on their knees.

Hence, application Ser. No. 16/214,239.

That application allows a switch, receptacle or combination of both, to be modularly connected, and plugged into a HUB. The HUB, wires, (and termination devices, if desired) can be "dropped" into a junction box, where all connections are visible.

"The PRESENT APPLICATION" takes it one step further. It permanently combines termination devices onto one board. The board will make all electrical connections between all termination devices, the HUB, and the wires. The pins on the back of the termination device, (that gets plugged into the HUB), will re-route power to the termination devices, and out of the box to other lines.

The present Invention provides a means to electrically and physically connect a multiple of switches and/or receptacles into an array, which then plugs into a SINGLE HUB, whereby WIRES, HUB, and BOARD can be "DROPPED" into a junction box, AS ONE UNIT.

This is a continuation-in-part application. This application includes a modification to the dielectric body or HUB. Whereas, the other related applications made all wires visible and identifiable leading up to the set screws, this modification allows the "bare wire tips" to go slightly beyond the set screws. This modification allows the installer to be sure the set screw made contact with the wire, in a non-transparent HUB. These Wire Stick Out Grooves (WSOG) are shown in FIG. 9 as WSOG 1, WSOG 2, and WSOG 3.

Some prior art show wire connections, but on a very limited basis. There devices must be removed in order to see ALL CONNECTIONS, especially since some connections are made in the rear of their device. They also do not have the use of my HUB.

It should be noted, that herein the use of the word "a" or "an" when used in conjunction with the term "comprising" (or the synonymous "having") in the claims and/or the specification may mean "one," but it is also consistent with the meaning of "one or more," "at least one," and "one or more than one." An example would be "a switch box". It means a box that has one or more switches in it. Someone skilled in the art or an unskilled person would not say "A switches box" for a box containing two switches.

In addition, as used herein, the phase "connected to" and the like, means; joined to or placed into communication with, either directly or though intermediate components.

BRIEF DESCRIPTION OF THE DRAWINGS

For a better understanding of the present invention, reference is made to the following description of exemplary embodiments thereof, considered in conjunction with the accompanying drawings, in which:

FIG. 7 is a perspective view of various Multi-Receptacle/switch combination boards. These boards are designed as one-piece devices, at the time of manufacture, which distinguishes it from earlier patents and patent applications.

FIG. 8 is a perspective view of a Multiplex Electrical Termination Device Board, installed in a multi-gang electrical box, shown with wires entering the box, in an open wall installation.

FIG. 9 is a perspective view of the "ENDS" of each wire, VERIFYING the fact, that EACH wire has been thru the correct set screw fastening area.

REFERENCE NUMERALS

Figure 1:
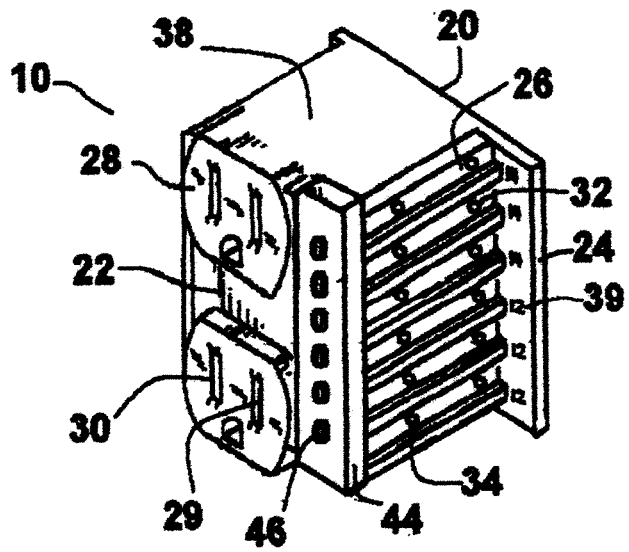
FIG. 1 is an exploded perspective view of an exemplary embodiment of the HUB or DIRECTRIC BODY of the wire connection system.
Figure 2:
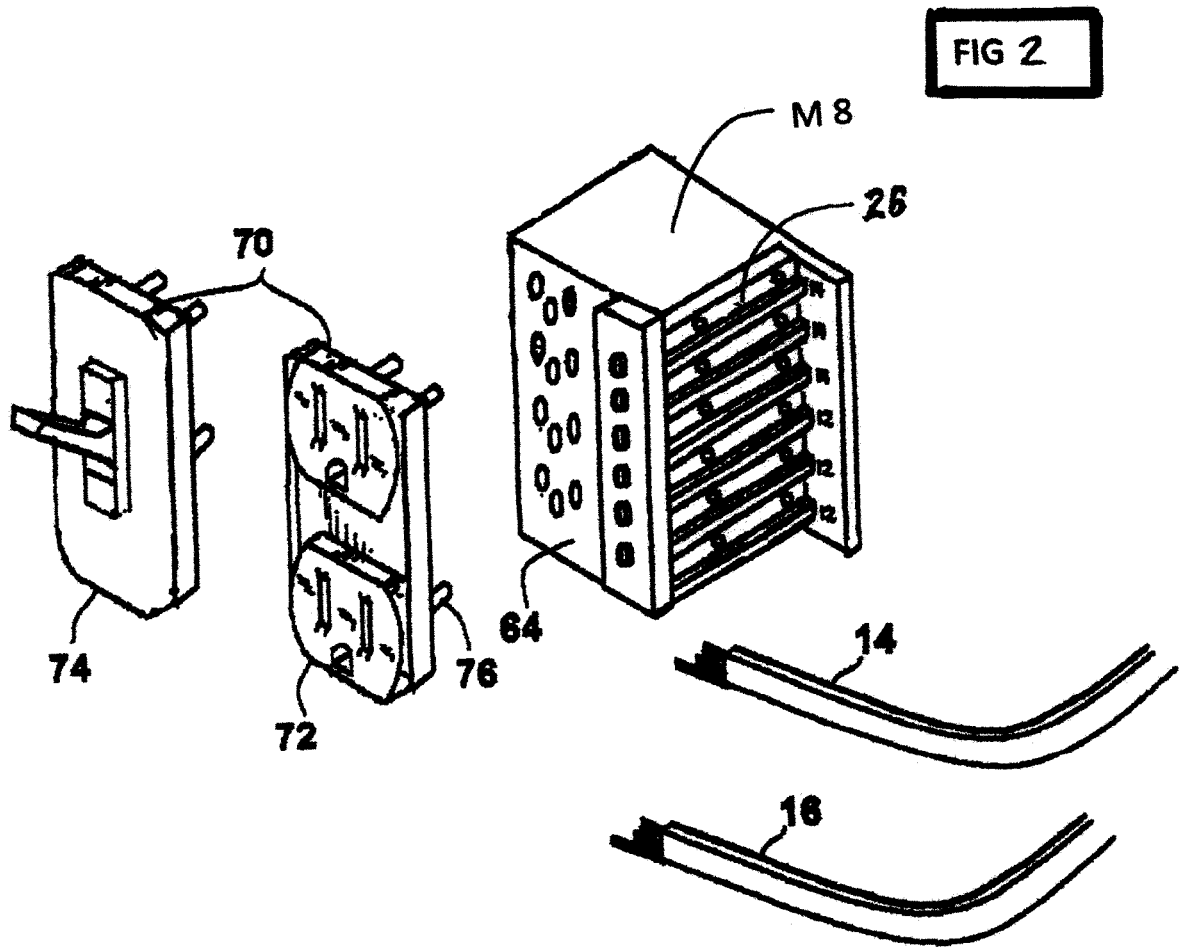
FIG. 2 is an exploded perspective view of an alternate embodiment of the HUB OR DIELECTRIC BODY, with a movable, not attached, termination device.
Figure 3:
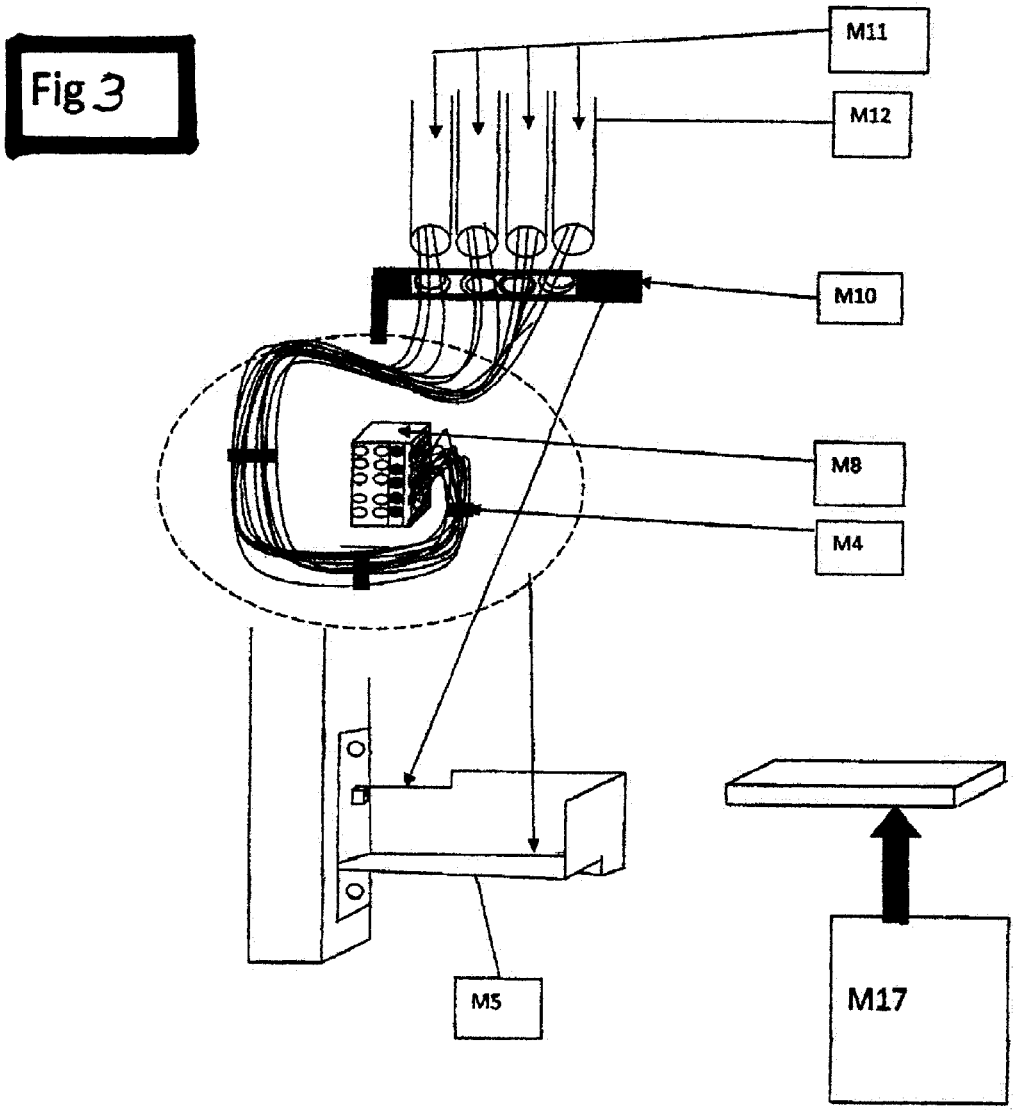
FIG. 3 is a perspective view of a wiring harness, attached to a HUB or DIELECTRIC body, just before insertion of both into a specifically designed junction box.
Figure 4:
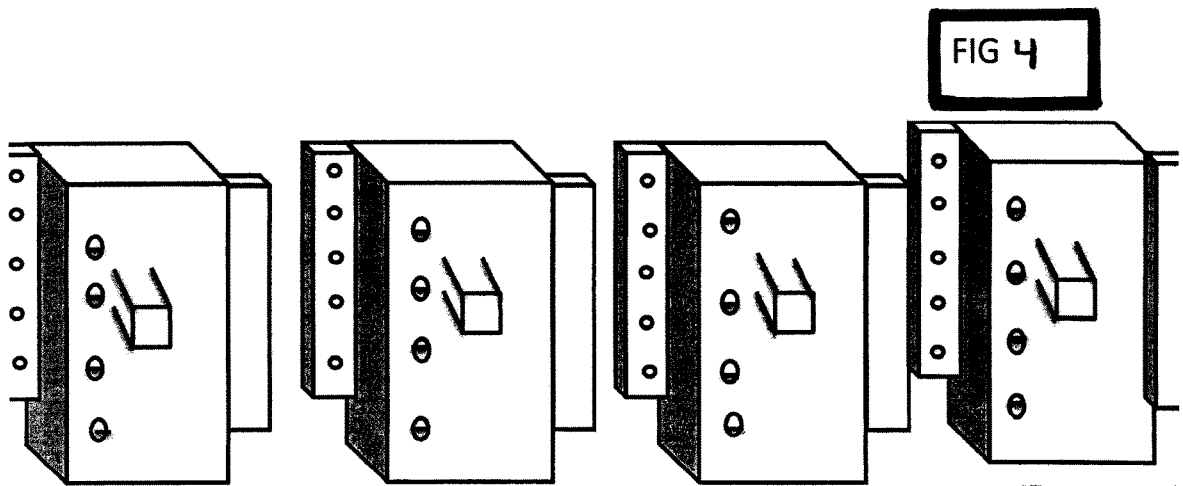
FIG. 4 is a perspective view of the left side of switches, showing prong receivers, as a part of a modulator connection.
Figure 5:
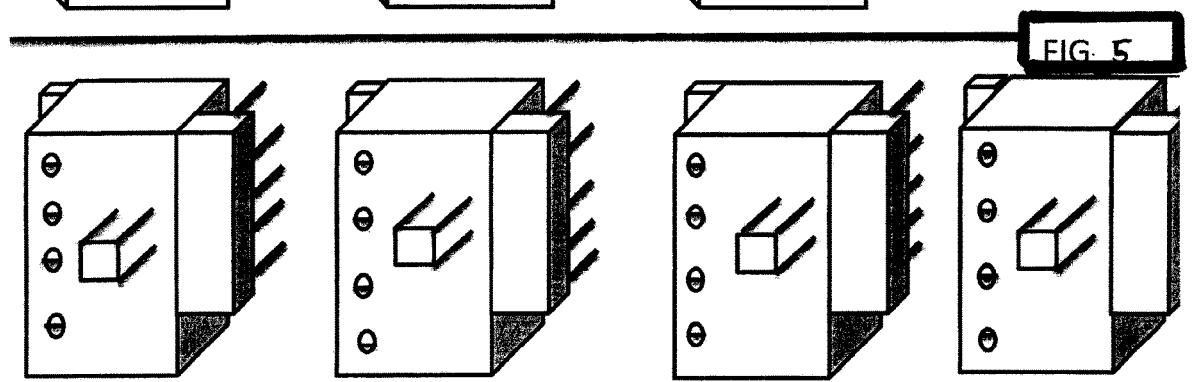
FIG. 5 is a perspective view of the right side of switches, showing prongs as a part of a modulator connection.
Figure 6:
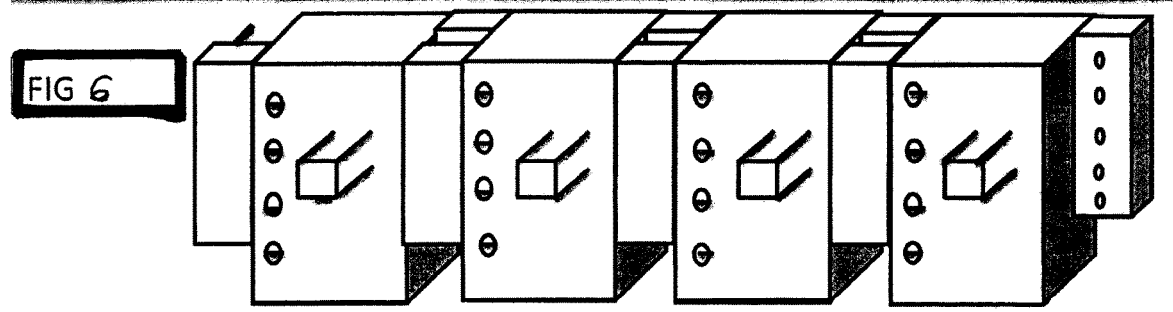
FIG. 6 is a perspective view of switches, with modulator connections, snapped together and forming a one piece termination unit. Various termination devices can be combined.

10. Wire connecting system
14. #14 wire cable
16. #12 wire cable
20. Connector block assembly
22. Front panel
24. Rear panel
26. Vertical column of connector ports
28. A termination device
29. Power receptacle port
30. Neutral receptacle port
32. Neutral ports
34. Power ports
38. Dielectric body
39. Wire gauge indicator
44. Grounding bus
46. Ground screws
64. Front of rear hub
70. Separate termination devices
72. Receptacle
74. Switch
76. Posts that plug into the ports on the front of the Rear hub (64)
M4. Electrical tape, to hold, support, and shape wires
M5. Multi-gang electrical box
M8. Dielectric body or HUB
M10. Appropriate Holder/bracket for ROMEX or BX cables
M11. Sheathed cable wires
M12. Cable sheathing
M17. Movable top cover
M18. Multi-receptacle/switch board
VW1. Viewable window (slot opening) for the GROUND wires
VW2. Viewable window (slot opening) for the power wires VW3. Viewable window (slot opening) for the neutral wires
N1. Neutral wire
P1. Power wire
G1. Ground wire
SS1. Set Screws

What is claimed is:

1. An assembly comprising:
a dielectric body having an electrical input surface, the electrical input surface having a plurality of electrical input ports;
a termination device, electrically connected to the plurality of electrical input ports, adapted to receive a wire harness,
having a first wire stick out groove that accommodates a multiple wires,
a second wire stick out groove that accommodates the multiple wires, and
a third wire stick out groove that accommodates the multiple wires;
the first wire stick out groove, second wire stick out groove and third wire stick out groove each form a groove in the termination device that is exposed from the surface of the termination device;
a first group of set screws;
a second group of set screws; and
a third group of set screws,
a first wire from the multiple wires fixed to one of the first group of set screws will have the end of the wire extend past the first group of set screws into the first wire stick out groove and be exposed from the surface of the termination device;
a second wire from the multiple wires fixed to one of the second group of set screws will have the end of the wire extend past the second group of set screws into the second wire stick out groove and be exposed from the surface of the termination device; and
a third wire from the multiple wires fixed to one of the third group of set screws will have the end of the wire extend past the third group of set screws into the third wire stick out groove and be exposed from the surface of the termination device;
an electrical component having multiple switches and/or receptacles formed integrally, the electrical component having a back side, connection posts extending from the electrical component back side, the connection posts are inserted into the plurality of electrical input ports.

2. The assembly of claim 1, further comprising: the first wire stick out groove has a first depth in the termination device, the second wire stick out groove has a second depth in the termination device, the third wire stick out groove has a third depth in the termination device, the first depth, the second depth and the third depth all have different numerical values.

* * * * *